United States Patent Office 3,397,570
Patented Aug. 20, 1968

3,397,570
UNIDIRECTIONAL METER PROVER
Raymond H. Pfrehm, Houston, Tex., assignor to Esso
Research and Engineering Company
Filed June 13, 1966, Ser. No. 557,249
8 Claims. (Cl. 73—3)

ABSTRACT OF THE DISCLOSURE

A unidirectional loop-type meter prover system eliminating valves between the inlet and outlet is provided by using a plurality of sealing members one of which forms a seal between the inlet and outlet while another one of the sealing members is traveling between spaced apart detection points.

---

The present invention is directed to a unidirectional meter prover for a pipeline system. More particularly, the invention is concerned with a unidirectional meter prover employing a plurality of sealing members. In its more specific aspects, the invention is concerned with a valveless unidirectional meter prover in a fluid pipeline system.

The present invention may be briefly described as an improvement in a unidirectional return-type meter prover system having a meter arranged in a pipeline and in which spaced-apart detection means arranged in a calibrated section of the meter prover system are sequentially actuated by sealing means movable by fluid flow through said section. The particular improvement of the present invention involves at least one inlet means connecting to the system and one outlet means spaced downstream from the inlet means connecting to the system for discharge of fluid, the inlet and outlet means connecting to the system by foraminiferous means permitting passage of fluid into the system. A rotatable means, which may suitably be a turnstile, is mounted for rotation in 90° increments within the system to move a returned spherical sealing means past the outlet means and is operable exteriorally of the system.

At least three sealing means are arranged in the system, one of the sealing means being propelled by fluid introduced through the inlet means past the spaced apart detection means for proving the meter. At least another of the sealing means provides a seal between the inlet and outlet means. The sealing means are preferably spherical sealing means. Other sealing means may be used such as sealing means made of a compressible or deformable material which will effect a seal with the internal wall of the pipeline. The rotatable means is adapted to move the returned sealing means into sealing position and thence into position to be propelled by fluid introduced by the inlet means.

The rotatable means which is preferably a turnstile means is ratcheted for movement in 90° increments in the direction of flow. This prevents the spherical sealing means from being moved backward in the unidirectional return-type system since inlet pressure is higher than outlet pressure by virtue of the arrangement. The turnstile rotatable means is suitably enclosed in a housing such that any leakage between the spherical sealing means may be discharged into the outlet. The rotatable turnstile sealing means is operable exteriorally of the system by a shaft extended to the exterior of the system which may be operated manually or by power means as may be desired.

The present invention will be further illustrated by reference to the drawing in which.

Figure 1:
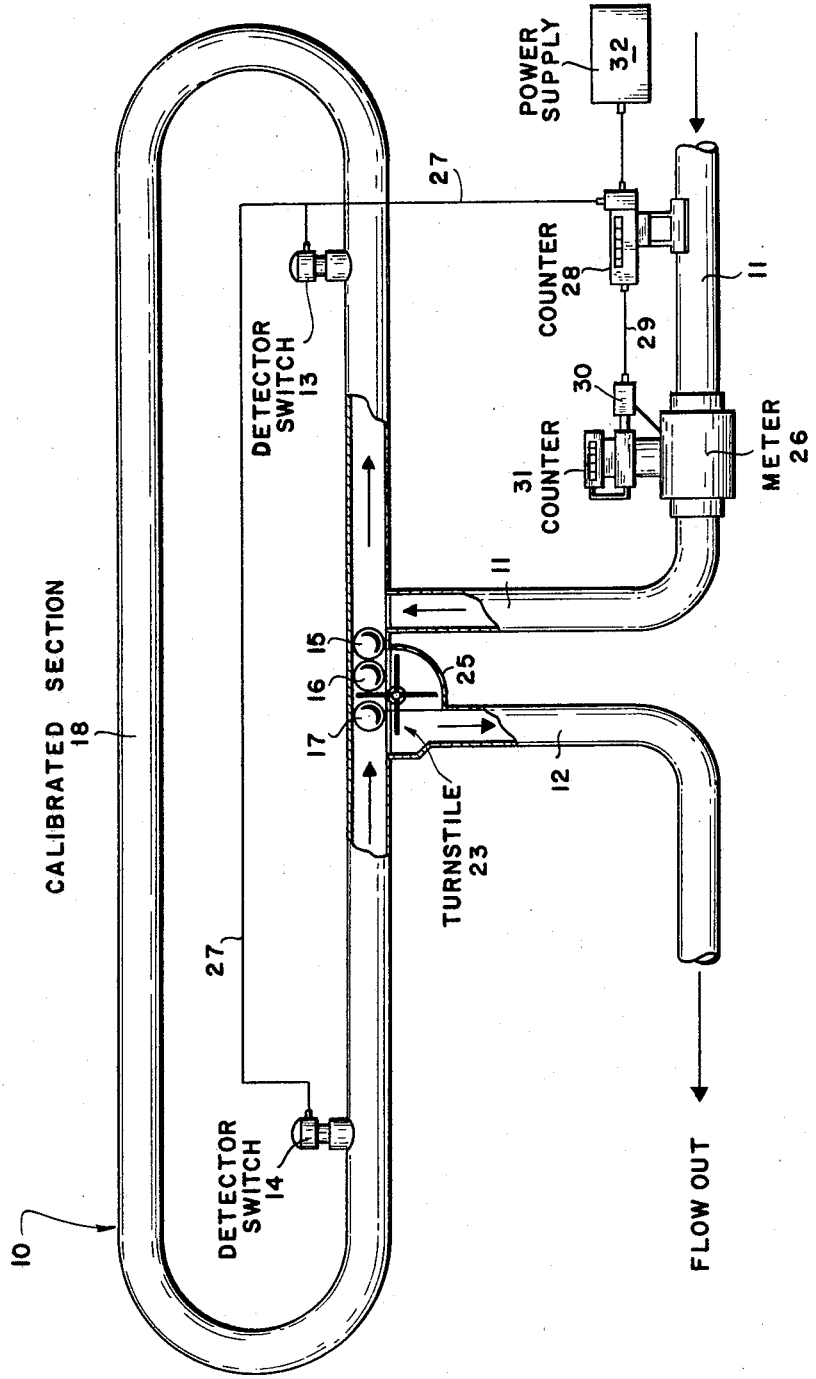
FIG. 1 is a showing of the preferred system utilizing a meter arranged in the inlet means and the detector switches connected to the meter proving counter which is in turn connected to the pulse generator.

In the several figures of the drawing in which a best mode and embodiment are set forth, numeral 10 designates a unidirectional meter prover system provided with inlet means 11 and outlet means 12 and having spaced-apart first and second switches or detection means 13 and 14 which are connected as will be described further to a meter proving counter and to a meter. Arranged in the prover system are at least three spherical sealing means 15, 16 and 17 which are shown in position for sealing and launching into the calibrated section 18 of the system 10 which is between the first detection means 13 and the second detection means 14.

Figure 2:
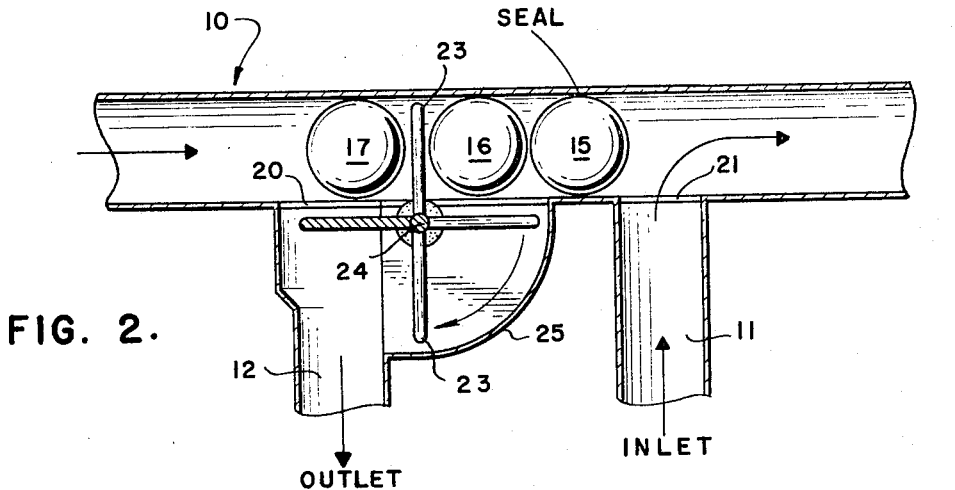
FIG. 2 is a view of the rotatable means and the spherical sealing means in the non-operating position.

Referring now to FIG. 2, the spherical sealing means 15, 16 and 17 are shown in position between the inlet 11 and the outlet 12. The outlet 12 connects to the system 10 by a slotted or foraminous means 20, and the inlet 11 is likewise connected to the system 10 by slotted or foraminous means 21. The foraminous means 20 and 21 allow passage of fluid from the inlets to the system and from the system to the outlet.

A rotationally-mounted turnstile means 23 is mounted on a shaft 24 which extends to the exterior of the system 10. This rotational means rotates in the direction of the arrows and is ratcheted for movement clockwise in 90° increments and, as evident from the drawing, permits passage of fluid through the system 10 in any position thereof. Thus, with three spherical sealing means as shown in FIG. 2, with the inlet 11 being employed, a seal is provided between the inlet 11 and the outlet 12 by the sealing means 15.

Figure 3:
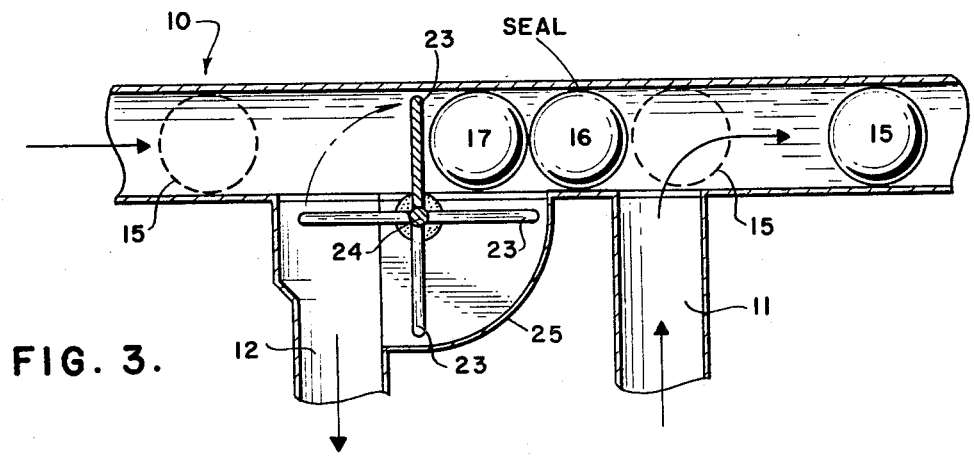
FIG. 3 is a view of the device of FIG. 2 showing one of the three sealing means being injected into the system.

Referring now to FIG. 3, it will be seen that the turnstile 23 has rotated 90°, forcing the spherical means 15 (shown in dotted lines) just past the center axis of the inlet 11, whereby it is injected into the system by fluid pressure. Spherical means 16 now provides the seal needed between the inlet 11 and the outlet 12. Spherical means 15 (again shown in dotted line sat the left of FIG. 3) illustrates the position assumed after it has passed through the calibrated section 18 and approaches the turnstile 23 to assume the same position as spherical means 17 in FIG. 2. Thus, it is evident that a seal is at all times maintained between the inlet 11 and the outlet 12 by one of the spherical sealing means.

A housing 25 encloses the rotatable ratcheted turnstile means 23 so as to provide a fluid-tight system.

Figure 4:
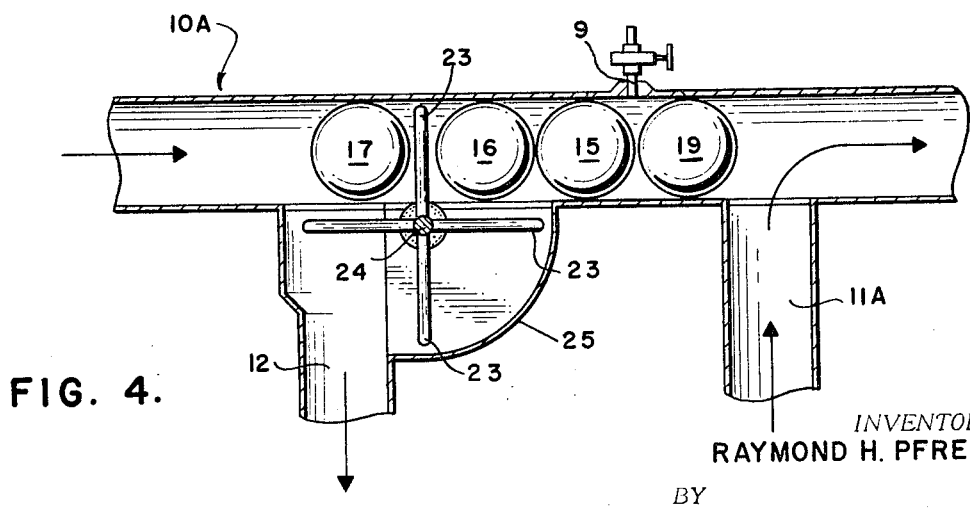
FIG. 4 is a view similar to that of FIG. 2, utilizing four spherical sealing means instead of three.

Referring now to FIG. 4, a system 10A is provided with four spherical sealing means instead of three, with the difference being that the inlet 11A is spaced farther from the outlet 12 and a seal is provided as shown, between the inlet and outlet by two of the sealing means. A valved bleeder tap 9 is positioned as shown to provide a "block and bleed" to check for or detect leakage past the sealing spheres when four spheres are used. Four spheres are necessary to provide a "block and bleed" arrangement.

Referring again to FIG. 1, a meter 26, which may be a displacement meter or any type of meter, such as velocity or head flow meter and the like, is provided in the inlet 11 for introduction of fluid into the system 10. The first detector switch 13 is connected by electrical connecting means 27 to a meter proving counter 28 which in turn is connected by electrical connection means 29 to a pulse generator 30 which is connected to meter 26. A meter counter 31 connects to the pulse generator 30. The electrical meter proving counter 28 receives electrical power supply through electrical lead 32. Electrical leads 27 lead to the second detector switch 14.

In operation of the device as illustrated in the several figures of the drawing, the several spherical sealing means, such as 15, 16, 17 and 19, will remain within the system and no valve is needed. One of the biggest problems encountered with the unidirectional meter prover is the valve ordinarily used to receive and launch the sphere. This valve must also provide a tight seal while the spherical sealing means is in transit through the prover loop system. Besides being a source of leakage and consequent error, the exchange valve is quite expensive. Elimination of the valve is therefore quite important and useful and allows, in accordance with the present invention, positive sealing, elimination of the source of leakage and error, and an economic gain. The unidirectional prover system in accordance with the present invention eliminates the valve and performs the same function as the valved unidirectional prover employing a plurality of spherical sealing means. Thus, in accordance with the present invention, the valve is eliminated and an accurate and leakproof prover system is employed.

Thus, referring back to the several figures, one of the spherical sealing means is propelled through the calibration section 18 past the first detection means or switch 13 to actuate the calibration means and then on passage of the second detection switches or means 14 stops the calibration run. By virtue of the seal provided with the spheres, it is unnecessary to have expensive valves which are prone to leakage. The present invention is therefore important and useful.

The unidirectional return-type prover system is a prover system similar to that described in the American Petroleum Institute Booklet, "API Standard 2531," first edition, December 1963, entitled "Mechanical Displacement Meter Provers." On page 19 of said booklet will be found a description of a typical unidirectional return-type prover system of which the the present invention is an improvement thereover.

The nature and objects of the present invention having been completely described and illustrated and the best mode and embodiment contemplated set forth, what I wish to claim as new and useful and secure by Letters Patent is:

1. In a unidirectional return-type meter prover system in which a meter is arranged in a pipeline and in which spaced-apart detection means arranged in a calibrated section of said prover system are sequentially actuated by sealing means movable by fluid flow through said section, the improvement which comprises:
   at least an inlet means connecting to said system;
   an outlet means spaced downstream from said inlet means connecting to said system;
   said inlet and outlet means connecting to said system by foraminous means permitting passage of fluid through said system;
   a rotatable means mounted for rotation in 90° increments within said system to move a returned sealing means past said outlet means and operable exteriorly or said system; and
   at least three sealing means arranged in said system;
   one of said sealing means being propelled by fluid introduced through said inlet means past said spaced apart detection means for proving said meter;
   at least another of said sealing means providing a seal between said inlet and outlet means;
   said rotatable means permitting free passage of fluid through said system in any position thereof;
   said rotatable means being adapted to move said returned sealing means into sealing position and thence into position to be propelled by said fluid.

2. Apparatus in accordance with claim 1 in which the rotatable means is a ratcheted turnstile means.

3. Apparatus in accordance with claim 1 in which the rotatable means is enclosed in a housing.

4. Apparatus in accordance with claim 1 comprising one inlet means and three sealing means.

5. Apparatus in accordance with claim 1 comprising two spaced-apart inlet means and four sealing means.

6. Apparatus in accordance with claim 1 in which the rotatable means is operated through a shaft extended to the exterior of the system.

7. Apparatus in accordance with claim 1 in which the sealing means are spherical.

8. Apparatus in accordance with claim 1 comprising four spherical sealing means in which means are provided for detecting leakage.

References Cited

UNITED STATES PATENTS

| 2,948,142 | 8/1960 | Zimmerman | 73—3 |
| 2,948,143 | 8/1960 | Pruitt | 73—3 |
| 3,081,472 | 3/1963 | Van Dijk | 137—268 XR |
| 3,146,477 | 9/1964 | Bergman et al. | 15—104.06 |
| 3,158,888 | 12/1964 | Ericson | 15—104.06 |
| 3,186,014 | 6/1965 | Allen | 73—3 XR |
| 3,224,247 | 12/1965 | Barrett | 73—3 |
| 3,232,090 | 2/1966 | Walker | 73—3 |

FOREIGN PATENTS 650,762   10/1962   Canada.

DAVID SCHONBERG, *Primary Examiner.*

N. B. SIEGEL, *Assistant Examiner.*